United States Patent
Yi et al.

(10) Patent No.: US 8,374,117 B2
(45) Date of Patent: Feb. 12, 2013

(54) APPARATUS AND METHOD FOR SETTING UP RADIO BEARER IN WIRELESS COMMUNICATION SYSTEM

(75) Inventors: Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 292 days.

(21) Appl. No.: 12/795,297

(22) Filed: Jun. 7, 2010

(65) Prior Publication Data

US 2010/0309837 A1  Dec. 9, 2010

Related U.S. Application Data

(60) Provisional application No. 61/184,833, filed on Jun. 7, 2009, provisional application No. 61/219,366, filed on Jun. 22, 2009.

(30) Foreign Application Priority Data

Jun. 4, 2010  (KR) .................. 10-2010-0052993

(51) Int. Cl.
  *H04J 1/10* (2006.01)
(52) U.S. Cl. ....................... 370/315; 370/338

(58) Field of Classification Search .................. 370/315, 370/352, 509, 395.21, 395.42, 338, 331; 709/225; 455/436
See application file for complete search history.

(56) References Cited

U.S. PATENT DOCUMENTS

2007/0110016 A1   5/2007  Shen et al.
2010/0022184 A1*  1/2010  Khoshnevis et al. ............. 455/7

FOREIGN PATENT DOCUMENTS

| EP | 1 734 774 A1 | 12/2006 |
| EP | 1 773 091 A2 | 4/2007 |
| EP | 1 981 223 A1 | 10/2008 |

* cited by examiner

*Primary Examiner* — Chandrahas Patel
(74) *Attorney, Agent, or Firm* — McKenna Long & Aldridge LLP

(57) ABSTRACT

A method and apparatus of setting up a radio bearer (RB) in a wireless communication system is provided. At least one UnRB is set up based on a quality of service (QoS) guaranteed between a relay node and a base station. The relay node sets up a connection with a user equipment, and selects a UnRB of which a QoS corresponds to a QoS of the service request from the at least one UnRB according to a service request from the user equipment. A UuRB which is to be mapped to the selected UnRB is set up between the relay node and the user equipment.

6 Claims, 12 Drawing Sheets

APPARATUS AND METHOD FOR SETTING UP RADIO BEARER IN WIRELESS COMMUNICATION SYSTEM

CROSS-REFERENCE TO RELATED APPLICATIONS

This application claims the benefit of priority of U.S. Provisional applications 61/184,833 filed on Jun. 7, 2009, 61/219,366 filed on Jun. 22, 2009, and Korean Patent Application No. 10-2010-0052993 filed on Jun. 4, 2010, all of which are incorporated by reference in their entirety herein.

BACKGROUND OF THE INVENTION

1. Field of the Invention

The present invention relates to wireless communications, and more particularly, to a method and apparatus for setting up a radio bearer (RB) in a wireless communication system.

2. Related Art $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

An LTE-A system employs new techniques such as carrier aggregation and a relay. The carrier aggregation is used to flexibly extend an available bandwidth. The relay is used to increase a cell coverage and support group mobility and to enable user-centered network deployment.

The relay provides two types of radio interfaces. One is a Uu interface between a relay and a user equipment, and the other is a Uu interface between the relay and a base station. A radio bearer is set up in each radio interface. In order for the user equipment to receive a service from the base station via the relay, two radio bearers need to be set up.

The radio bearer setup may be delayed as the number of radio bearers to be set up increases. This may result in a service delay.

Accordingly, there is a need for a method capable of preventing a radio bearer setup delay in a system employing a relay.

SUMMARY OF THE INVENTION

The present invention provides a method and apparatus for setting up a radio bearer (RB) in a wireless communication system.

In an aspect, a method of setting up a radio bearer (RB) in a wireless communication system is provided. The method includes setting up at least one UnRB based on a quality of service (QoS) guaranteed between a relay node and a base station, setting up, by the relay node, a connection with a user equipment, selecting a UnRB of which a QoS corresponds to a QoS of the service request from the at least one UnRB according to a service request from the user equipment, and setting up a UuRB, which is to be mapped to the selected UnRB, between the relay node and the user equipment.

The method may further include reporting activation of the selected UnRB to the base station after the UuRB is set up.

The activation of the selected UnRB may be reported to the base station when the selected UuRB is not previously used.

The selected UnRB may be selected on the basis of RB mapping information received from the base station.

The method may further include releasing the UuRB, and reporting inactivation of the selected UnRB to the base station after the UuRB is released.

In another aspect, a relay node for setting up a radio bearer (RB) in a wireless communication system is provided. The relay node includes an interface unit configured to provide a radio interface, and a processor operatively coupled to the interface unit, wherein the processor is configured for setting up at least one UnRB according to a quality of service (QoS) guaranteed between a relay node and a base station, setting up a connection with a user equipment, selecting a UnRB of which a QoS corresponds to a QoS of the service request from the at least one UnRB according to a service request from the user equipment, and setting up a UuRB, which is to be mapped to the selected UnRB, between the relay node and the user equipment.

In another aspect, a method of setting up a radio bearer (RB) in a wireless communication system is provided. The method includes receiving a service request from a user equipment, setting up a UnRB between a relay node and a base station according to the service request, setting up a UuRB between the relay node and the user equipment, and reporting activation of the UnRB by the relay node to the base station after the UuRB setup is complete.

A radio bearer (RB) setup delay caused by the use of a relay can be prevented. Therefore, a service delay can be reduced, and the relay can reliably operate between a user equipment and a base station.

DESCRIPTION OF EXEMPLARY EMBODIMENTS

Figure 1:
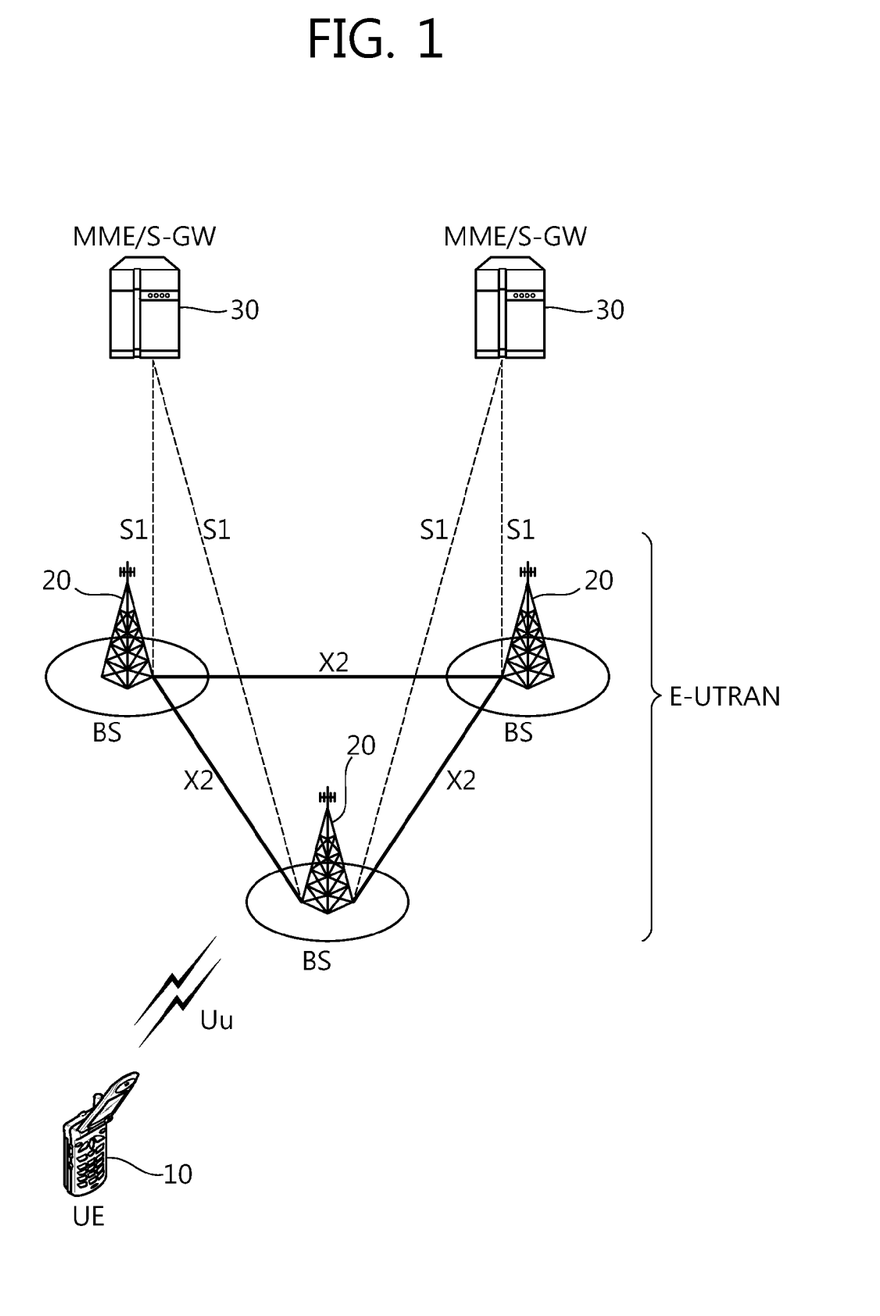
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is referred to as a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
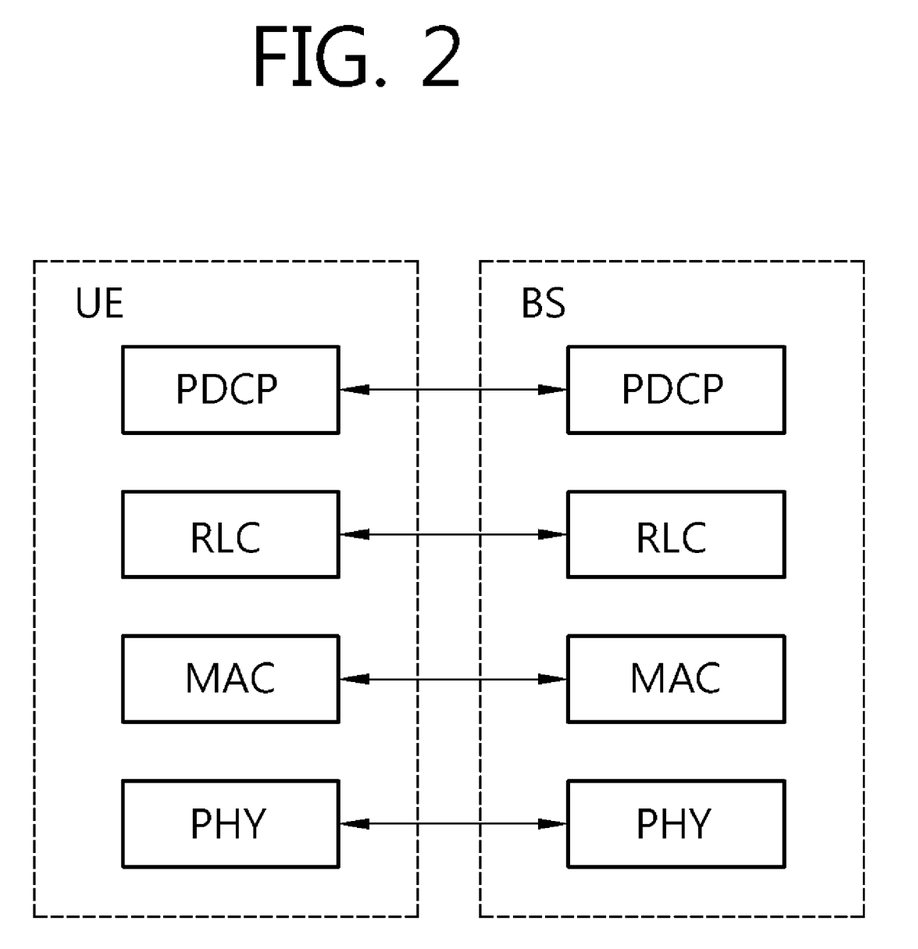
FIG. 2 is a diagram showing a radio protocol architecture for a user plane.
Figure 3:
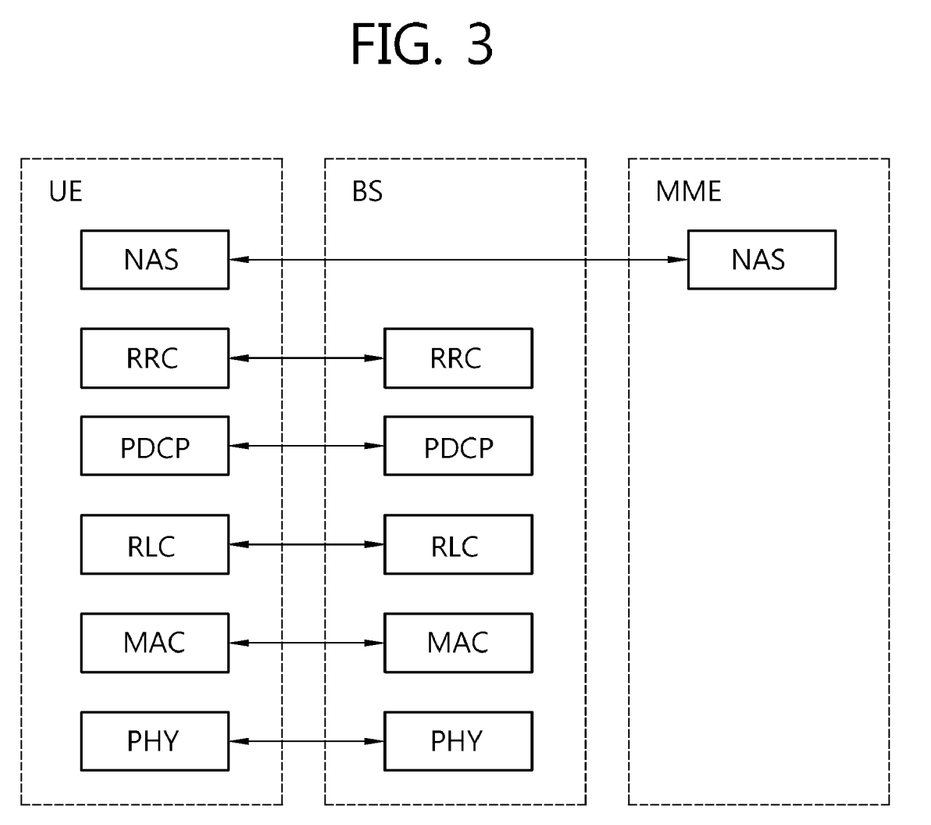
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIG. 2 and FIG. 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A function of a packet data convergence protocol (PDCP) layer in the user plane includes user data delivery, header compression, and ciphering. A function of a PDCP layer in the control plane includes control-plane data delivery and ciphering/integrity protection.

A radio resource control (RRC) layer is defined only in the control plane. The RRC layer serves to control the logical channel, the transport channel, and the physical channel in association with configuration, reconfiguration and release of RBs.

An RB is a logical path provided by the first layer (i.e., PHY layer) and the second layer (i.e., MAC layer, RLC layer, and PDCP layer) for data delivery between the UE and the network. An RB setup procedure is a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

When an RRC connection exists between an RRC layer of the UE and an RRC layer of the network, the UE is in an RRC connected state, and otherwise the UE is in an RRC idle state.

Figure 4:
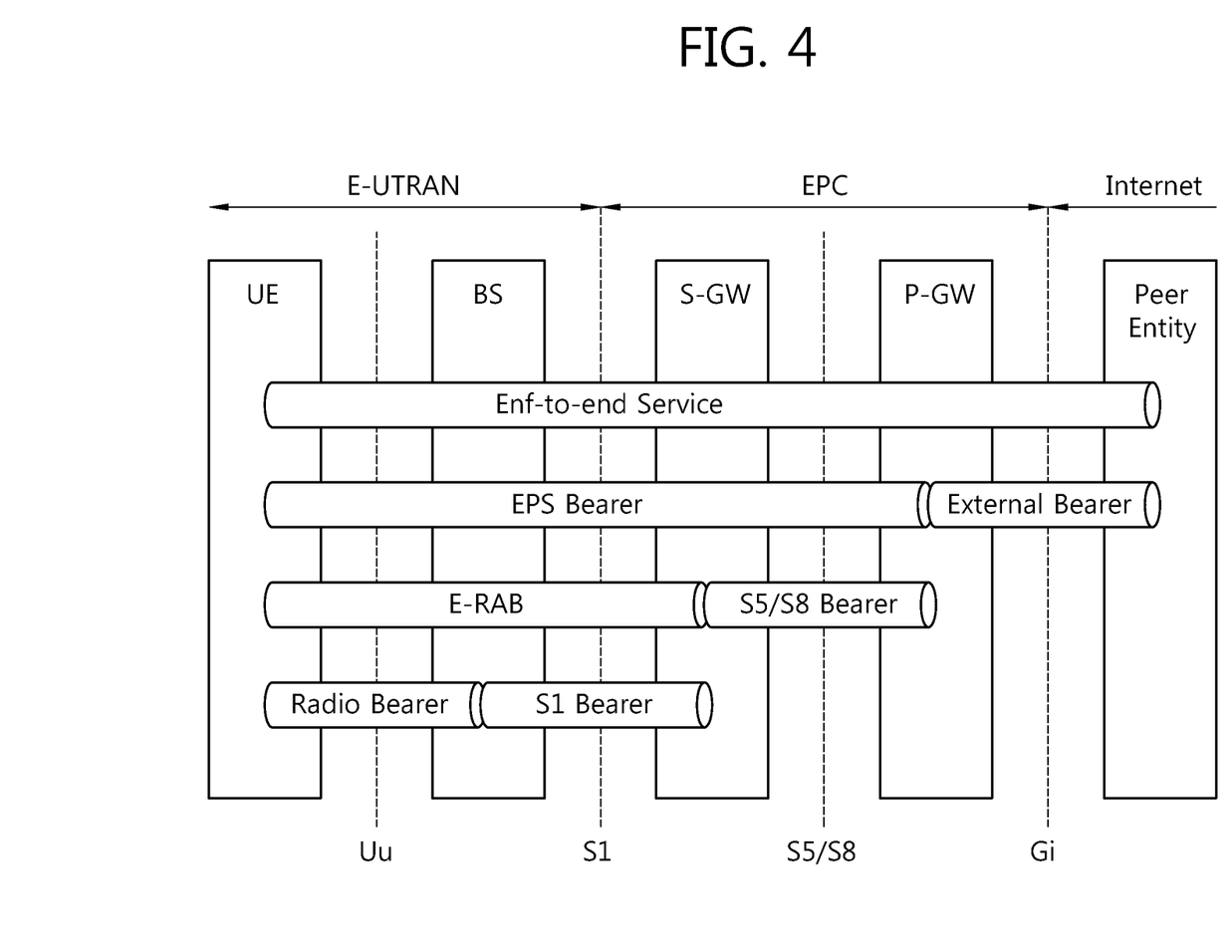
FIG. 4 shows a structure of a bearer service in $3^{rd}$ generation partnership project (3GPP) long term evolution (LTE).

FIG. 4 shows a structure of a bearer service in 3GPP LTE. An RB is a bearer provided through a Uu interface to support a service of a user. By defining a bearer for each interface, the 3GPP LTE ensures independency between interfaces.

Bearers provided by a 3GPP LTE system are collectively referred to as an evolved packet system (EPS) bearer. For each interface, the EPS bearer is classified into a radio bearer (RB), an S1 bearer, and so on.

A packet gateway (P-GW) is a network node for connecting an LTE network and another network. The EPS bearer is defined between a UE and the P-GW. The EPS bearer is further divided between nodes, and thus an RB is defined between the UE and a BS, an S1 bearer is defined between the BS and an S-GW, and an S5/S8 bearer is defined between the P-GW and the S-GW in an EPC. Each bearer is defined by using a quality of service (QoS). The QoS is defined by using a data rate, an error rate, a delay, etc.

Therefore, a QoS to be provided generally in the LTE system is first defined by using the EPS bearer, and thereafter a QoS of each interface is defined. Each interface sets up a bearer according to a QoS to be provided by itself.

Regarding bears of respective interfaces, QoSs of all EPS bearers are provided by being divided for each interface. Therefore, the EPS bearer, the RB, the S1 bearer, and so on have a one-to-one relation.

A long-term evolution-advanced (LTE-A) system is an LTE system evolved to conform to an IMT-advanced requirement which is a $4^{th}$ generation mobile communication requirement recommended by international telecommunication union-radio communication sector (ITU-R). An LTE-A system standard has actively been developed in recent years in 3GPP which developed the LTE system standard.

The LTE-A system employs new techniques such as carrier aggregation and a relay. The carrier aggregation is used to flexibly extend an available bandwidth. The relay is used to increase a cell coverage and support group mobility and to enable user-centered network deployment.

Figure 5:
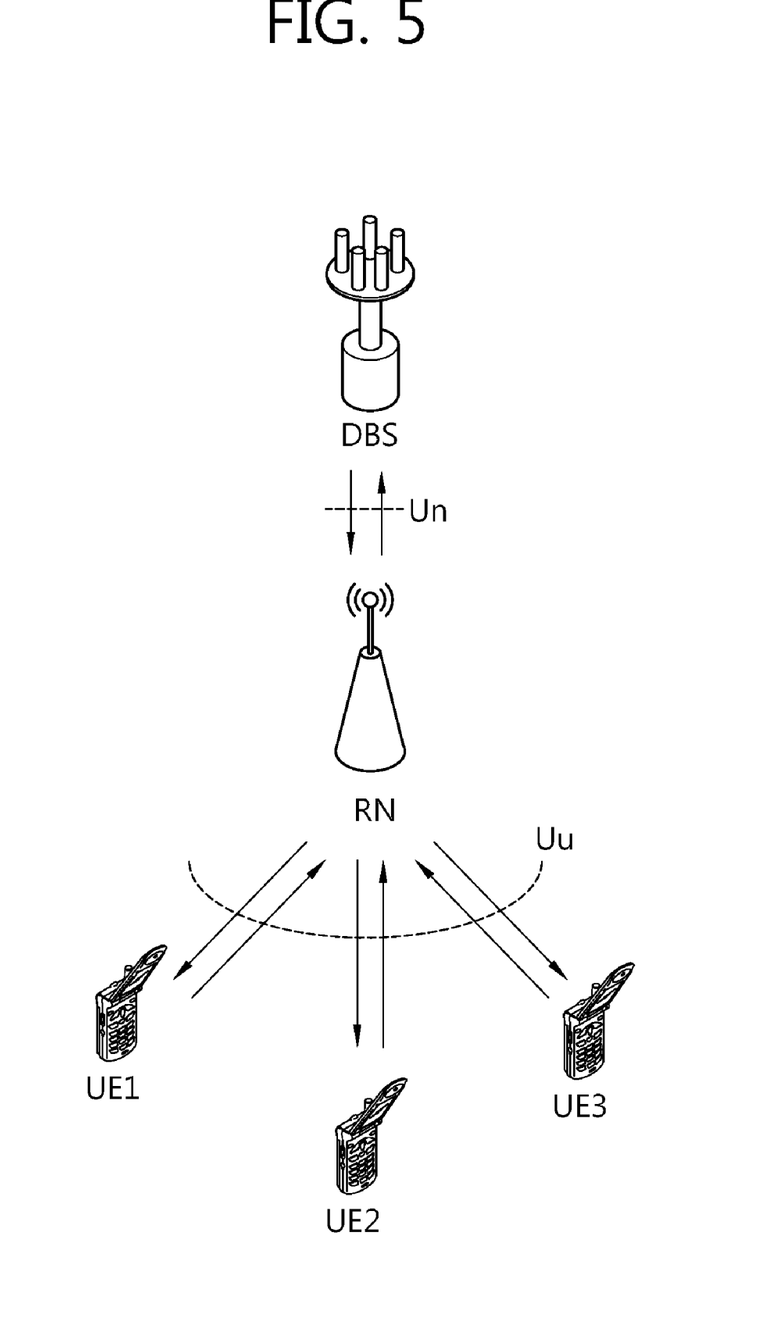
FIG. 5 shows a network system supporting a relay.

FIG. 5 shows a network system supporting a relay. The relay serves to relay data between a UE and a BS. A network node for performing a relay function is referred to as a relay node (RN). A BS for managing one or more RNs is referred to as a donor BS (DBS).

A radio interface between the UE and the RN is referred to as a Uu interface. A radio interface between the RN and the DBS is referred to as a Un interface. A link between the UE and the RN is referred to as an access link. A link between the RN and the DBS is referred to as a backhaul link.

The RN manages the UE on behalf of the DBS. The UE can receive a service transparently from the DBS via the RN. This implies that it is not necessary to know whether the UE receives the service from the DBS via the RN or whether the UE receives the service directly from the DBS. Therefore, the Uu interface between the UE and the RN can use a Uu interface protocol used by the 3GPP LTE almost without changes.

From the perspective of the DBS, the RN can receive a service as a UE and also can receive the service as a BS of the UE. For example, when the RN initially accesses the DBS, the DBS does not know whether the RN attempts to access. Therefore, the RN can attempt to access the DBS by performing a typical random access process similarly to other UEs. Once the RN has accessed the DBS, the RN operates as if it is a BS for managing a UE connected to the RN.

Accordingly, a Un interface protocol is necessarily defined in a format in which a function of a network protocol is added together with a function of the Uu interface protocol. Regarding the Un interface protocol, there is an ongoing discussion on which function is to be added or changed in each protocol layer in current 3GPP on the basis of the Uu interface protocol such as MAC/RLC/PDCP/RRC layers.

Figure 6:
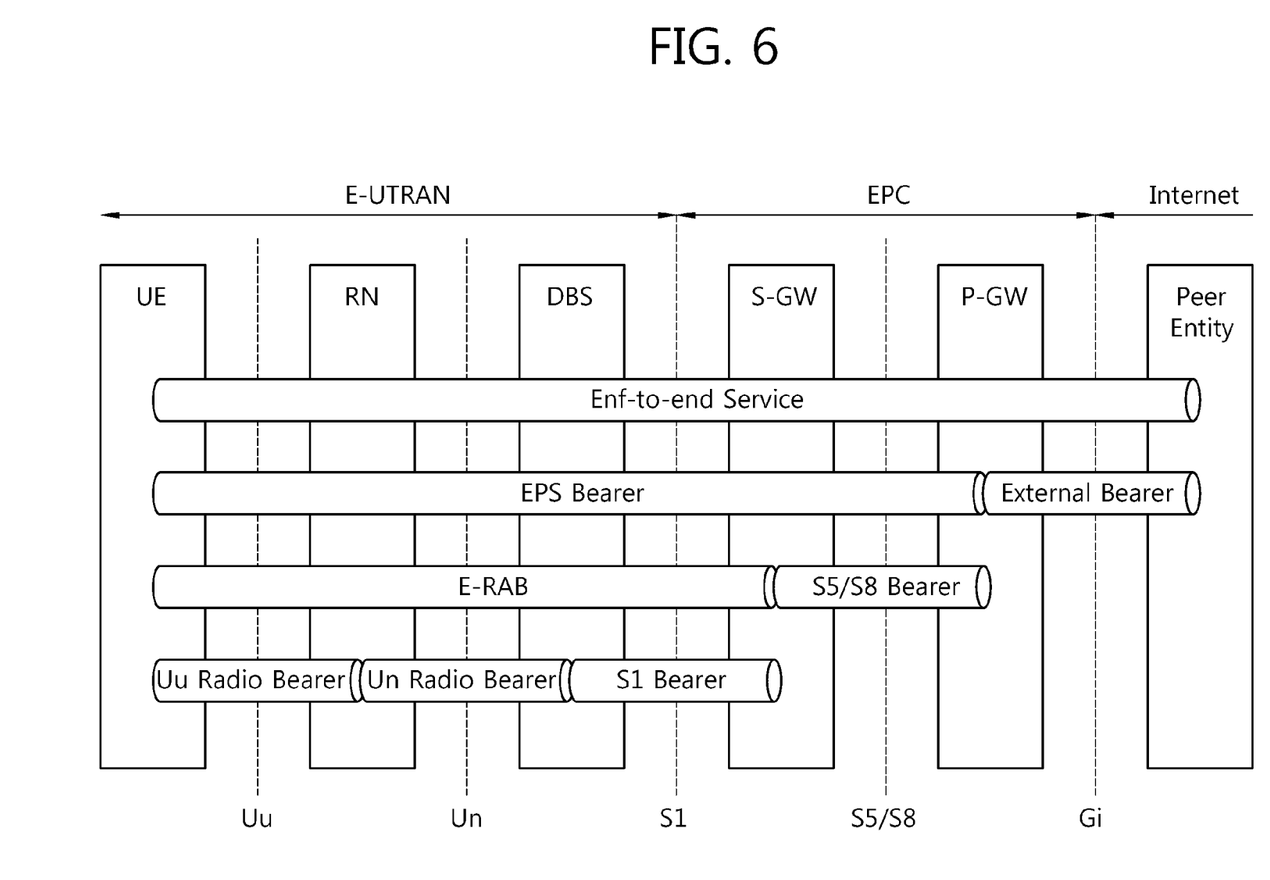
FIG. 6 shows an exemplary structure of a bearer service in a network system employing a relay.

FIG. 6 shows an exemplary structure of a bearer service in a network system employing a relay.

An EPS bearer is defined between a UE and a P-GW. More specifically, a Uu radio bearer (UuRB) is defined between the UE and an RN, a Un RB (UnRB) is defined between the RN and a DBS, and an S1 bearer is defined between the DBS and an S-GW. The UuRB can be defined to be identical to the existing RB between the UE and a BS.

Hereinafter, the UuRB denotes an RB which is set up in a Uu interface, and the UnRB denotes an RB which is set up in a Un interface.

Figure 7:
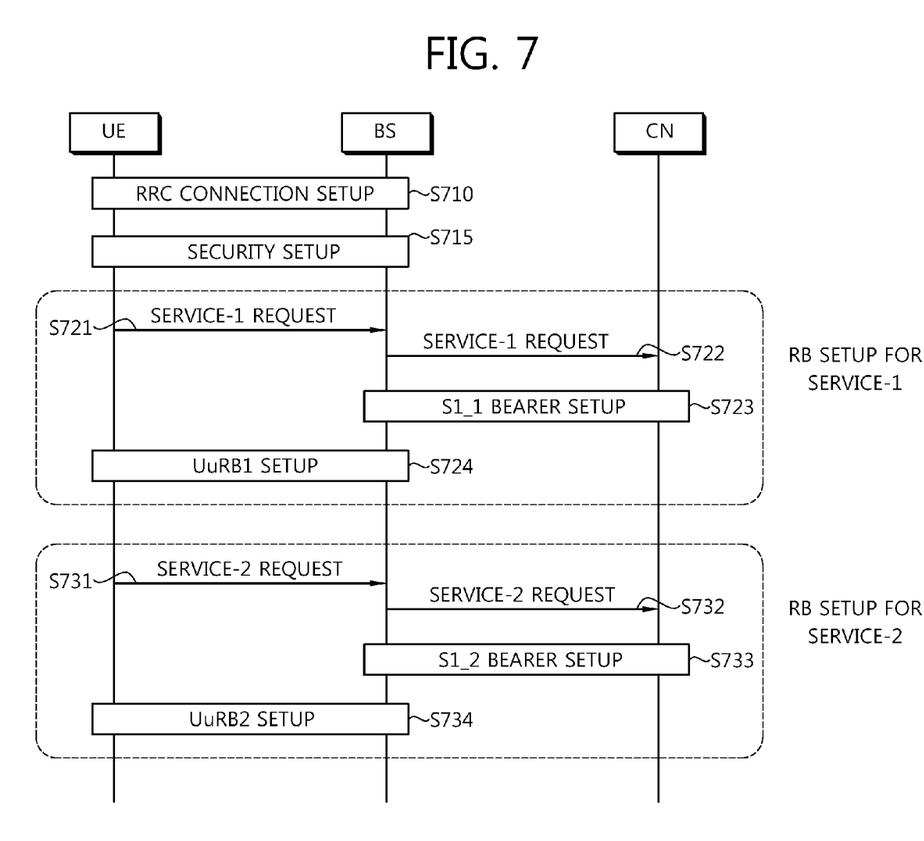
FIG. 7 is a flowchart showing a radio bearer (RB) setup procedure in a conventional LTE system.

FIG. 7 is a flowchart showing an RB setup procedure in a conventional LTE system.

A UE sets up an RRC connection with a BS (step S710), and thereafter sets up security (step S715).

The UE sends a service-1 request to the BS (step S721). The service-1 request is delivered to a core network (CN) via the BS (step S722). According to a QoS of the service-1 requested by the UE, an S1 bearer of the service-1, i.e., an S1_1 bearer, is set up between the CN and the BS (step S723). Further, a UuRB1 is set up between the BS and the UE (step S724). Accordingly, all RBs for the service-1 are set up between the UE and the CN.

Likewise, the UE sends a service-2 request to the BS (step S731). The service-2 request is delivered to the CN via the BS (step S732). According to a QoS of the service-2 requested by the UE, an S1 bearer of the service-2, i.e., an S1_2 bearer, is set up between the CN and the BS (step S733). Further, a UuRB2 is set up between the BS and the UE (step S734). Accordingly, all RBs for the service-2 are set up between the UE and the CN.

To set up an RB in a radio interface, parameters related to respective radio protocol layers of a first layer and a second layer and configuration information need to be exchanged between nodes. Further, each node has to set up the radio protocol layers of the first layer and the second layer according to that information. Therefore, much time is required to set up the RB in a radio section.

Figure 8:
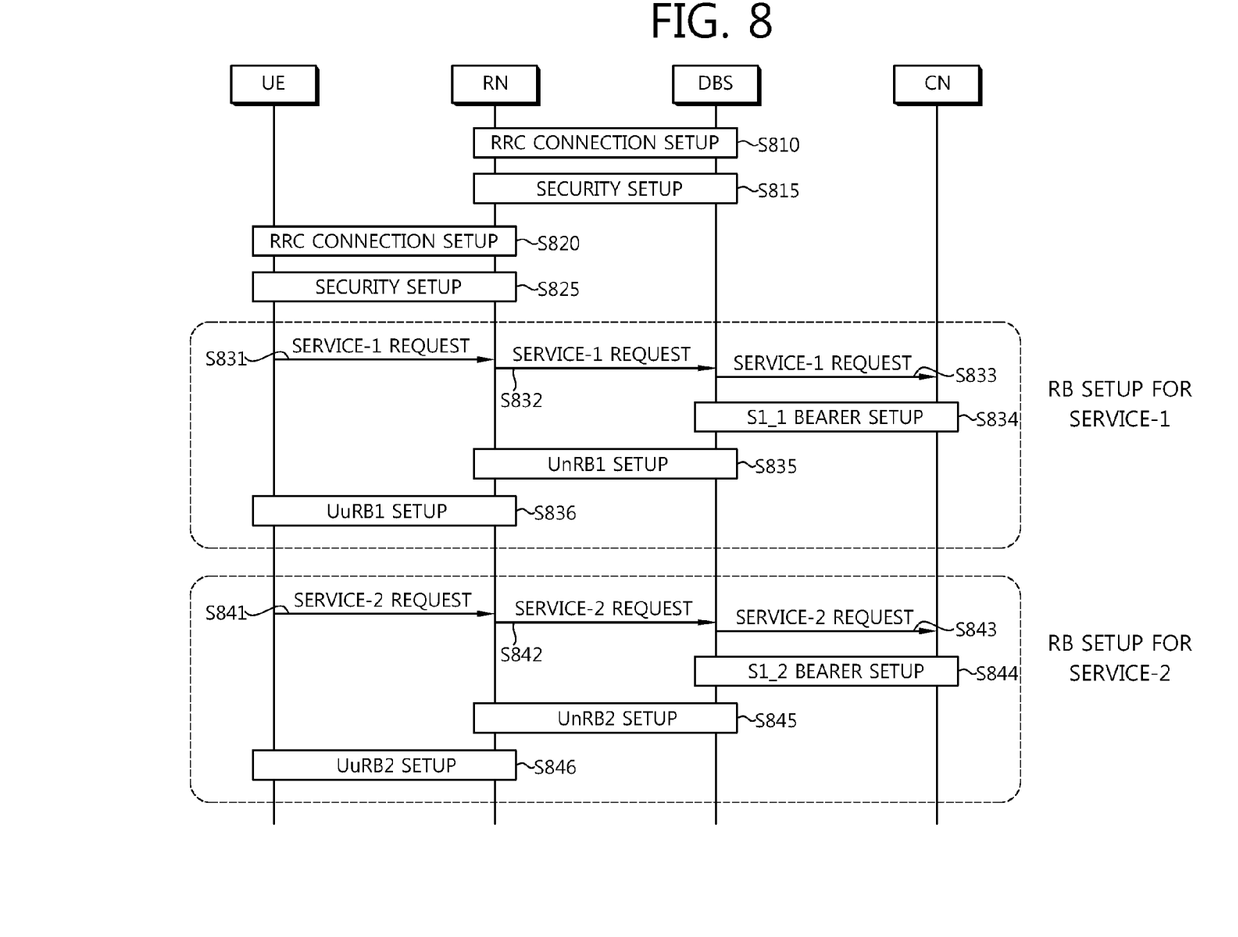
FIG. 8 is a flowchart showing an example of an RB setup procedure in an LTE system employing a relay node (RN).

FIG. 8 is a flowchart showing an example of an RB setup procedure in an LTE system employing an RN.

The RN sets up an RRC connection with a DBS (step S810), and thereafter sets up security (step S815). A UE sets up an RRC connection with the RN (step S820), and thereafter sets up security (step S825).

The UE sends a service-1 request to the RN (step S831). The service-1 request is delivered to a CN via the RN and the DBS (steps S832 and S833). According to a QoS of the service-1 requested by the UE, an S1 bearer of the service-1, i.e., an S1_1 bearer, is set up between the CN and the DBS (step S834). A UnRB1 is set up between the DBS and the RN (step S835). Further, a UuRB 1 is set up between the UE and the RN (step S836). Accordingly, all RBs for the service-1 are set up between the UE and the CN.

Likewise, the UE sends a service-2 request to the RN (step S841). The service-2 request is delivered to the CN via the RN and the DBS (steps S842 and S843). According to a QoS of the service-2 requested by the UE, an S1 bearer of the service-2, i.e., an S1_2 bearer, is set up between the CN and the DBS (step S844). A UnRB2 is set up between the DBS and the RN (step S845). Further, a UuRB2 is set up between the UE and the RN (step S846). Accordingly, all RBs for the service-2 are set up between the UE and the CN.

Since the LTE-A system employs the RN between the UE and the BS, two RBs (i.e., UnRB and UnRB) are set up. Therefore, a time required to set up all RBs is greater than that of the LTE system.

Accordingly, a method of decreasing a time required to set up all RBs of a UE in a wireless communication system employing an RN is proposed.

The RN initially accesses a DBS, and thereafter predicts QoSs (e.g., a delay, an error rate, a bit rate, etc.) to be supported without a service request of the UE and pre-determines one or more UnRBs based on each QoS. When the UE requests a service by accessing the RN afterwards, one of the pre-determined unRBs are used according to a requested QoS. Therefore, an RB setup time can be reduced generally.

Figure 9:
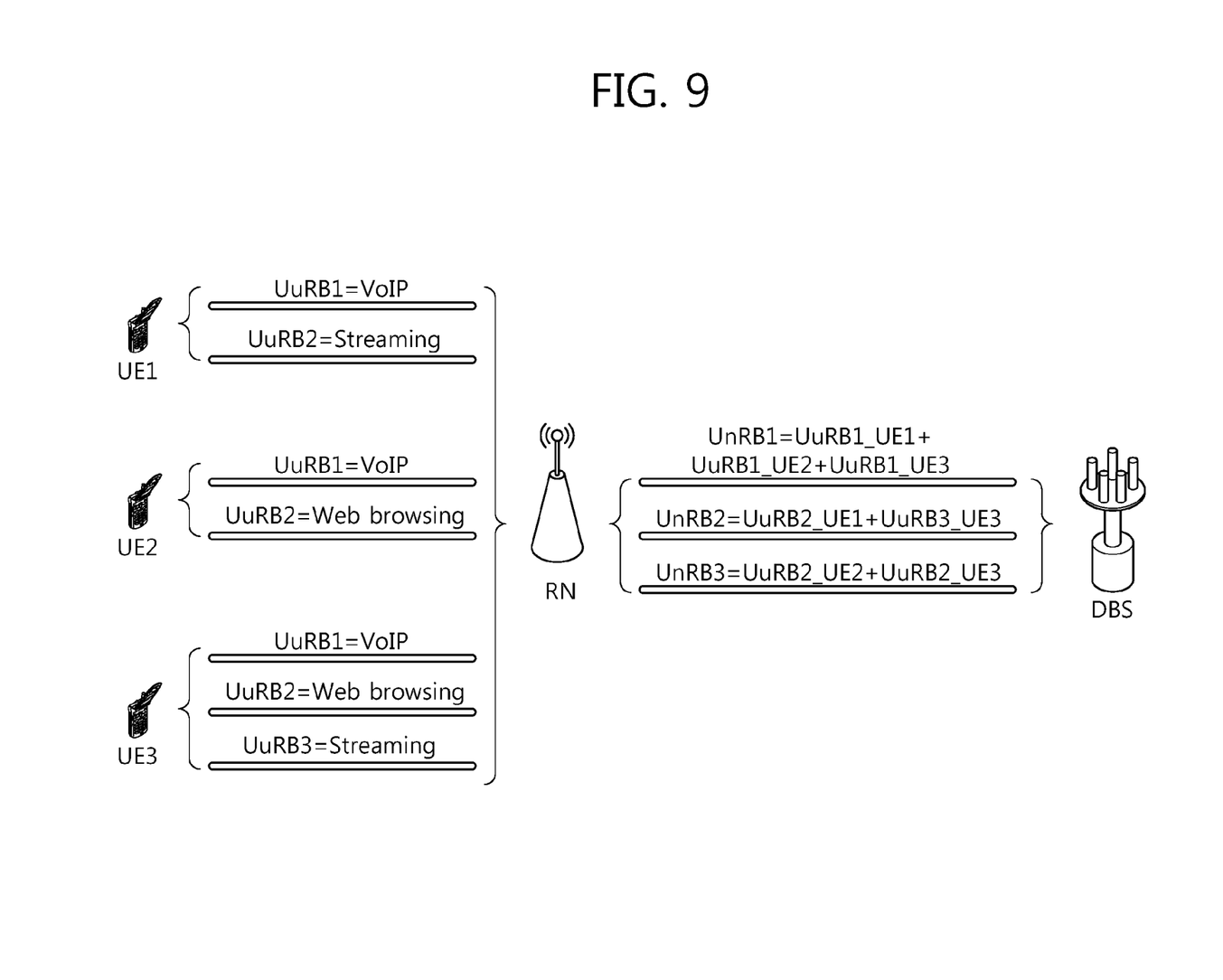
FIG. 9 shows an example of UuRB-UnRB mapping.

FIG. 9 shows an example of UuRB-UnRB mapping. In this case, a UnRB between an RN and a DBS is determined according to a QoS. A method of mapping UuRBs having identical or similar QoSs to a UnRB irrespective of a UE is referred to as per-QoS bearer mapping.

Since one UnRB ensures one QoS, a UuRB which is set up between the UE and the RN is mapped to a specific UnRB according to a QoS property irrespective of the UE. Among a plurality of UuRBs for a plurality of UEs, UuRBs having the same ensured QoS are mapped to the same UnRB, and UuRBs having different ensured QoSs are mapped to different UnRBs.

Several UuRBs are multiplexed and are transmitted using one UnRB, and thus a data packet transmitted through the UnRB may include a UE ID for identifying the UE and an RB ID for identifying an RB for one UE.

In the example of FIG. 9, a UuRB1_UE1, a UuRB1_UE2, and a UuRB1_UE3, each of which has a QoS for the same VoIP, are mapped to a UnRB1. A UuRB2_UE1 and a UuRB3_UE3, each of which has a QoS for streaming, are mapped to a UnRB2. A UuRB2_UE2 and a UuRB2_UE3, each of which has a QoS for web browsing, are mapped to a UnRB3. Each UnRB has a unique QoS supported by itself, and thus the number of UnRBs which are set up between the RN and the DBS is equal to the number of QoSs supported between the RN and the DBS.

When the number of UuRBs having the same QoS is great, radio resources may be insufficient to transmit data packets multiplexed using one UnRB. In this case, even UuRBs having the same QoS may be mapped to different UnRBs. On the other hand, if the radio resources are sufficient for one UnRB, one UnRB may support several similar QoSs. That is, UuRBs having similar QoSs are mapped to one UnRB.

Hereinafter, an RB may be a unidirectional RB supporting only an uplink or a downlink or may be a bidirectional RB supporting both the uplink and the downlink.

Figure 10:
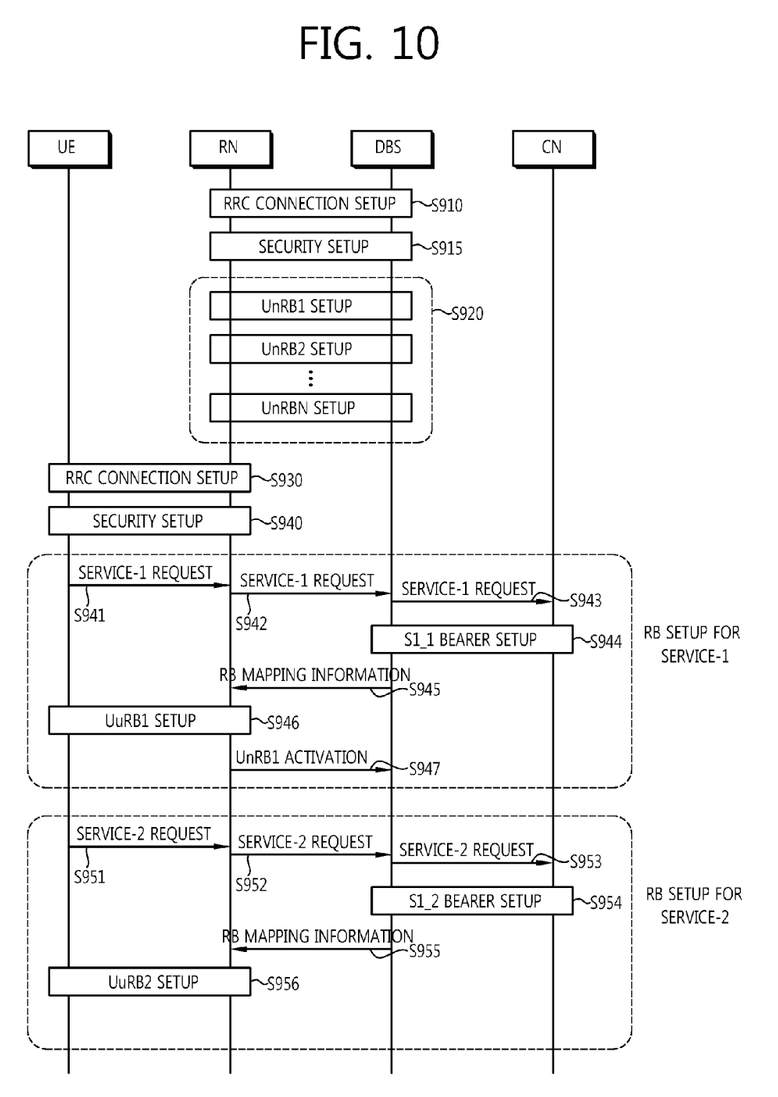
FIG. 10 is a flowchart showing an RB setup procedure according to an embodiment of the present invention.

FIG. 10 is a flowchart showing an RB setup procedure according to an embodiment of the present invention.

An RN sets up an RRC connection with a DBS (step S910), and thereafter sets up security (step S915).

The RN predicts a QoS of a service to be supported by the RN itself and sets up one or more UnRBs between the RN and the DBS (step S920). A group of the set-up UnRBs is referred to as a UnRB list. The UnRBs are not necessarily set up to support all possible QoSs. Thus, the UnRBs may be set up only for a frequently used service. As to a service not frequently used, the UnRB may be set up at a later time when there is a request from a UE.

If the UE intends to enter the coverage of the RN to receive a service, the UE sets up an RRC connection with the RN (step S930), and thereafter sets up security (step S940).

When the UE sends a service-1 request (step S941), this request is delivered to a CN via the RN and the DBS (steps S942 and S943).

The CN sets up an S1 bearer for the service-1, i.e., an S1_1 bearer, and requests the DBS to set up a UuRB and a UnRB (step S944).

Among the UnRBs previously set up between the DBS and the RN, the DBS selects a UnRB1 of which a QoS is equal or most similar to a QoS of the service-1, and reports RB mapping information to the RN (step S945). The DBS also requests to set up a UuRB1 between the RN and the UE. The RB mapping information includes information regarding a UnRB corresponding to the service-1 requested by the UE in the UnRB list.

The RN stores the RB mapping information and sets up the UuRB1 with respect to the UE (step S946).

After the UuRB1 setup is complete, the RN instructs the DBS to activate the UnRB1 (step S947). The UnRB1 can be used by activating the UnRB1. Accordingly, all RBs for the service-1 are set up between the UE and the CN.

If the UnRB has already been used for another service of the UE or for another UE, the RN not necessarily have to report UnRB activation after the UuRB setup is complete.

When the UE sends a service-2 request (step S951), this request is delivered to the CN via the RN and the DBS (steps S952 and S953). The CN sets up an S1 bearer for the service-2, i.e., an S1_2 bearer, and requests the DBS to set up a UuRB and a UnRB (step S954).

Among the UnRBs previously set up between the DBS and the RN, the DBS selects a UnRB1 of which a QoS is equal or most similar to a QoS of the service-2, and reports RB mapping information to the RN (step S955). The RN stores the RB mapping information and sets up the UuRB2 with respect to the UE (step S956).

When the previously activated UnRB1 is used for the UnRB2, the RN may not send the activation instruction to the DBS. Therefore, the RN can complete the RB setup procedure for the service-2 only by setting up the UuRB2.

The RN may report the UnRB activation to the DBS when the UuRB setup is complete irrespective of whether the UnRB is used.

Instead of reporting the RB mapping information by the DBS, the RN may select a UnRB according to a QoS of a service and thereafter report the selected UnRB to the DBS.

If only one UuRB is transmitted using the UnRB, the UnRB is no longer used once the UuRB is released. The RN may send a UnRB inactivation instruction to the DBS to report that the UnRB is no longer used.

RB mapping information between a service and a UnRB may have various formats. For example, since each service uses corresponding EPS bearer ID, the RB mapping information can be represented by an EPS bearer ID—a UnRB ID.

When the UnRB is set up in advance between the RN and the DBS, it is difficult to set up the UnRB by predicting QoS of all services. Therefore, the RN sets up a predetermined number of UnRBs, for example, 16 UnRBs. When various UnRBs are set up afterwards according to a service request of the UE, the number of UnRBs may exceed a maximum number of UnRBs permitted by the RN, for example, 32 UnRBs. If the RN receives a new service request from the UE in a situation where a maximum possible number of UnRBs are set up, the RN may delete one of UnRBs which are previously set up but are not used and may set up a UnRB that supports the service requested by the UE.

One or more UnRBs may be set up in advance between the RN and the DBS and only a mapping relation with the UnRB may be reported when the UuRB is set up. By doing so, a time required to set up all RBs of the UE managed by the RN can be reduced.

Figure 11:
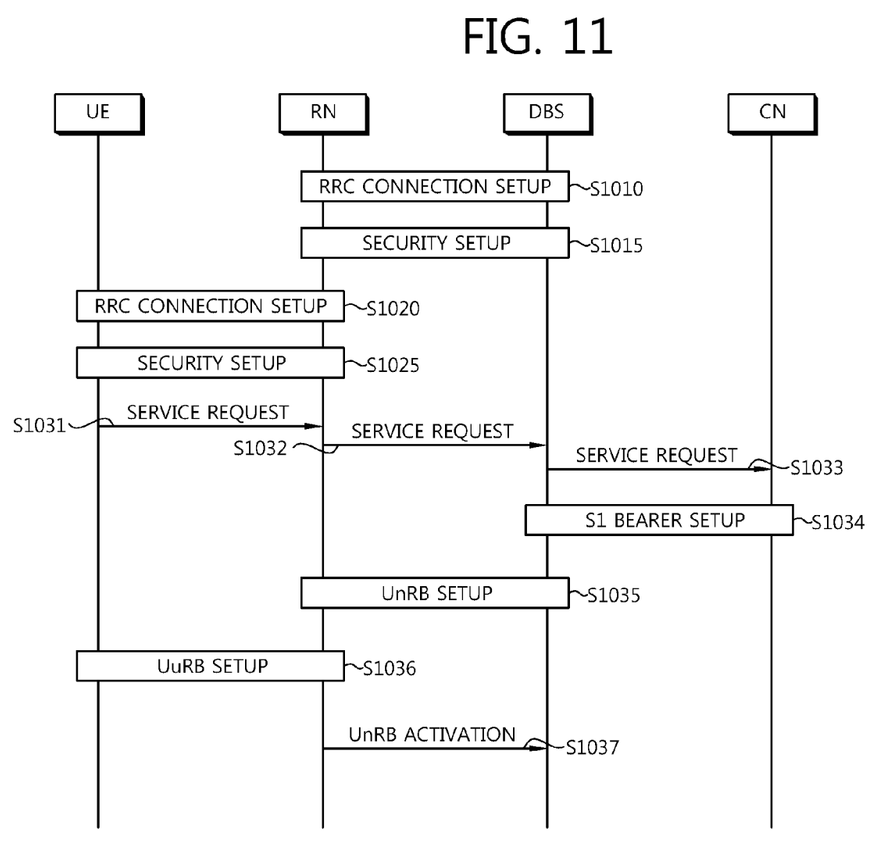
FIG. 11 is a flowchart showing an RB setup procedure according to an embodiment of the present invention.

FIG. 11 is a flowchart showing an RB setup procedure according to an embodiment of the present invention.

An RN sets up an RRC connection with a DBS (step S1010), and thereafter sets up security (step S1015).

If a UE intends to enter the coverage of the RN to receive a service, the UE sets up an RRC connection with the RN (step S1020), and thereafter sets up security (step S1025).

When the UE sends a service request (step S1031), this request is delivered to a CN via the RN and the DBS (steps S1032 and S1033).

The CN sets up an S1 bearer for the service requested by the UE, and requests the DBS to set up a UuRB and a UnRB (step S1034).

The DBS sets up a UnRB between the DBS and the RN (step S1035). In this case, if a UuRB is not yet set up with respect to the UE, the UnRB is not activated.

The RN sets up a UuRB with respect to the UE (step S1036). After the UuRB setup is complete, the RN instructs the DBS to activate the UnRB (step S1037). The UnRB can be used by activating the UnRB. Accordingly, all RBs for the service-1 are set up between the UE and the CN.

By instructing the UnRB activation after the UuRB setup is complete, a consumption of radio resource for the UnRB before the UuRB set up is not completed yet is prevented. Further, a data loss caused by a delay of any one of the UnRB and the UuRB can be avoided.

Figure 12:
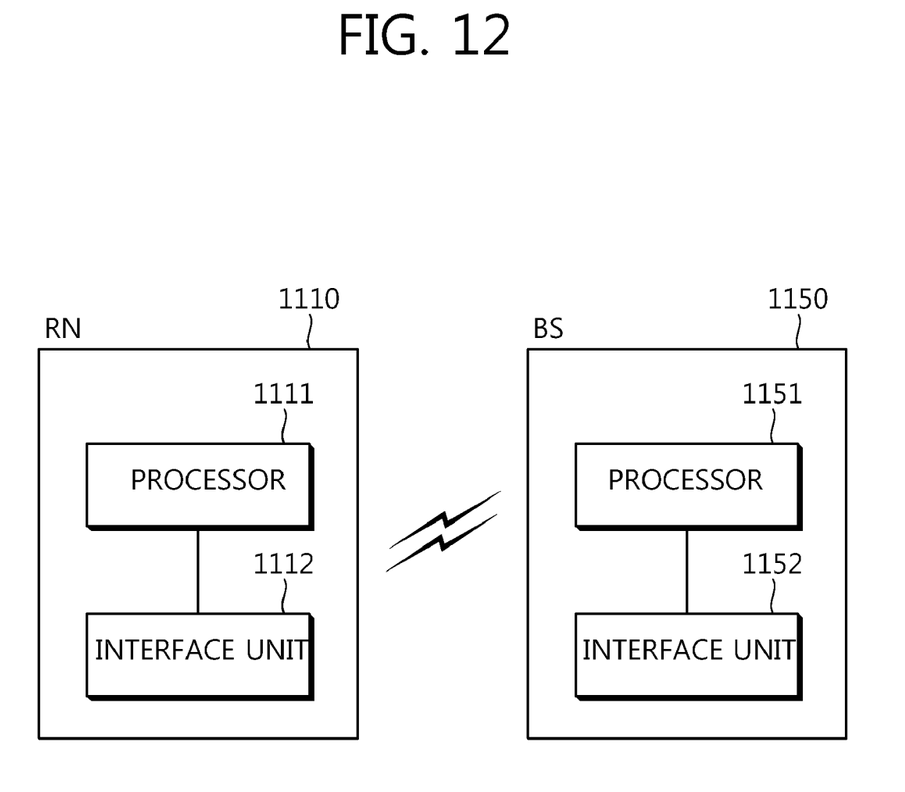
FIG. 12 is a block diagram showing wireless communication system to implement an embodiment of the present invention.

FIG. 12 is a block diagram showing wireless communication system to implement an embodiment of the present invention.

A RN 1110 includes a processor 1111, and an interface unit 1112. The interface unit 1112 provides radio interfaces. The interface unit 1112 provides a Uu interface between a UE and the RN 1110 and a Un interface between the RN 1110 and a BS 1150.

The processor 1111 may be configured to implement layers of the radio interface protocol and set up UuRB and UnRB. The processor 1111 may implement the operation of the RN in the embodiments of FIGS. 10 and 11.

A BS 1150 includes a processor 1151, and an interface unit 1152. The interface unit 1152 provides a Un interface between the RN 1110 and a BS 1150.

The processor 1151 may be configured to implement layers of the radio interface protocol and set up UnRB. The processor 1151 may implement the operation of the DBS in the embodiments of FIGS. 10 and 11.

The processors 1111, 1151 may include application-specific integrated circuit (ASIC), other chipset, logic circuit and/or data processing device. When the embodiments are implemented in software, the techniques described herein can be implemented with modules (e.g., procedures, functions, and so on) that perform the functions described herein. The modules can be executed by processors 1111, 1151.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of setting up a radio bearer (RB) in a wireless communication system, the method comprising:
    establishing, by a relay node, a plurality of first radio bearers (RBs) over a first radio interface between the relay node and a base station, each first RB being associated a guaranteed quality of service (QoS);
    receiving, by the relay node, a service request from a user equipment;
    selecting, by the relay node, a first RB among the plurality of first RBs based on a QoS required by the service request;
    determining, by the relay node, a second RB that is mapped to the selected first RB;
    establishing, by the relay node, the second RB over a second radio interface between the relay node and the user equipment; and
    reporting activation of the selected first RB to the base station after the second RB is established,
    wherein the activation of the selected first RB is reported to the base station when the first RB is not previously used.

2. The method of claim 1, wherein the selected first RB is selected on the basis of RB mapping information received from the base station.

3. The method of claim 1, further comprising:
    releasing the second RB; and
    reporting inactivation of the selected first RB to the base station after the second RB is released.

4. A relay node for setting up a radio bearer (RB) in a wireless communication system, the relay node comprising:
    an interface unit configured to provide a radio interface; and
    a processor operatively coupled to the interface unit, wherein the processor is configured for:
    establishing, by a relay node, a plurality of first radio bearers (RBs) over a first radio interface between the relay node and a base station, each first RB being associated a guaranteed quality of service (QoS);
    receiving, by the relay node, a service request from a user equipment;
    selecting a first RB among the plurality of first RBs based on a QoS required by the service request;
    determining a second RB that is mapped to the selected first RB;
    establishing the second RB over a second radio interface between the relay node and the user equipment; and
    reporting activation of the selected first RB to the base station after the second RB is established,
    wherein the processor is configured to report the activation of the selected first RB to the base station when the selected first RB is not previously used.

5. The relay node of claim 4, wherein the processor is configured to select the selected first RB on the basis of RB mapping information received from the base station.

6. The relay node of claim 4, wherein the processor is configured to report inactivation of the selected first RB to the base station after the second RB is released.

* * * * *